(12) United States Patent
Schuller

(10) Patent No.: US 12,104,673 B2
(45) Date of Patent: Oct. 1, 2024

(54) INFLATABLE CELLULAR STRUCTURE AND ARTICLE EQUIPPED THEREWITH

(71) Applicant: PRO SHOP RXR, Mouen (FR)

(72) Inventor: David Schuller, Caen (FR)

(73) Assignee: PRO SHOP RXR, Mouen (FR)

( * ) Notice: Subject to any disclaimer, the term of this patent is extended or adjusted under 35 U.S.C. 154(b) by 247 days.

(21) Appl. No.: 17/761,363

(22) PCT Filed: Aug. 27, 2020

(86) PCT No.: PCT/EP2020/074028
§ 371 (c)(1),
(2) Date: Mar. 17, 2022

(87) PCT Pub. No.: WO2021/052735
PCT Pub. Date: Mar. 25, 2021

(65) Prior Publication Data
US 2022/0290731 A1 Sep. 15, 2022

(30) Foreign Application Priority Data
Sep. 18, 2019 (FR) ...................................... 1910273

(51) Int. Cl.
*F16F 9/04* (2006.01)
*A41D 13/015* (2006.01)
*F16F 9/43* (2006.01)

(52) U.S. Cl.
CPC ............ *F16F 9/049* (2013.01); *A41D 13/015* (2013.01); *F16F 9/43* (2013.01); *F16F 2222/126* (2013.01);
(Continued)

(58) Field of Classification Search
CPC ........ F16F 9/43; F16F 9/049; F16F 2222/126; F16F 2224/02; F16F 2224/0225; F16F 2226/048; A41D 13/015
(Continued)

(56) References Cited

U.S. PATENT DOCUMENTS 5,030,501 A 7/1991 Colvin et al.
5,238,231 A 8/1993 Huang
(Continued)

OTHER PUBLICATIONS

International Search Report (PCT/ISA/210) issued in PCT/EP2020/074028 mailed on Nov. 16, 2020.
(Continued)

*Primary Examiner* — Catherine A. Simone
(74) *Attorney, Agent, or Firm* — Birch, Stewart, Kolasch & Birch, LLP

(57) ABSTRACT

The invention relates, inter alia, to an inflatable shock-absorbing cellular structure (1) which consists of two sealed sheets (10, 11) welded together along weld lines (100) that define inflatable cells (2), said inflatable cells (2) being arranged according to at least one two-dimensional matrix (MA) of n rows (L1-L6) and m columns (C1-C6) of cells (2), n and m being the same or different integers, each greater than or equal to 2, a peripheral cell (2) of the matrix (MA) being connected to an inflation nozzle (4). Said structure is characterised in particular in that: —the cells (2) are not contiguous; —the cells (2) of the row and/or column to which the peripheral cell (2) connected to the inflation nozzle (4) belongs communicate with one another through a channel (3) forming a constriction, while each remaining cell (2) of the matrix (MA) is also connected to at least one of the neighbouring cells (2) of the same row and/or the same column through a communication channel (3) forming a constriction.

13 Claims, 5 Drawing Sheets

(52) U.S. Cl.
CPC ... *F16F 2224/02* (2013.01); *F16F 2224/0225* (2013.01); *F16F 2226/048* (2013.01)

(58) Field of Classification Search
USPC .......................................................... 428/178
See application file for complete search history.

(56) References Cited

U.S. PATENT DOCUMENTS 5,771,490 A     6/1998   Reynolds et al.
7,865,969 B2 *   1/2011   Auger .............. A41D 19/01523
                                                                                         2/160

OTHER PUBLICATIONS

Written Opinion (PCT/ISA/237) issued in PCT/EP2020/074028 mailed on Nov. 16, 2020.

* cited by examiner

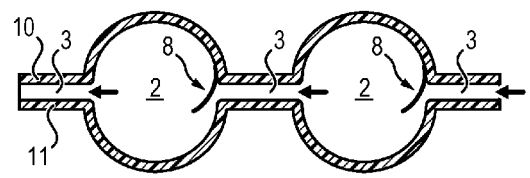
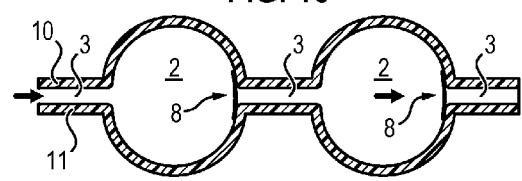
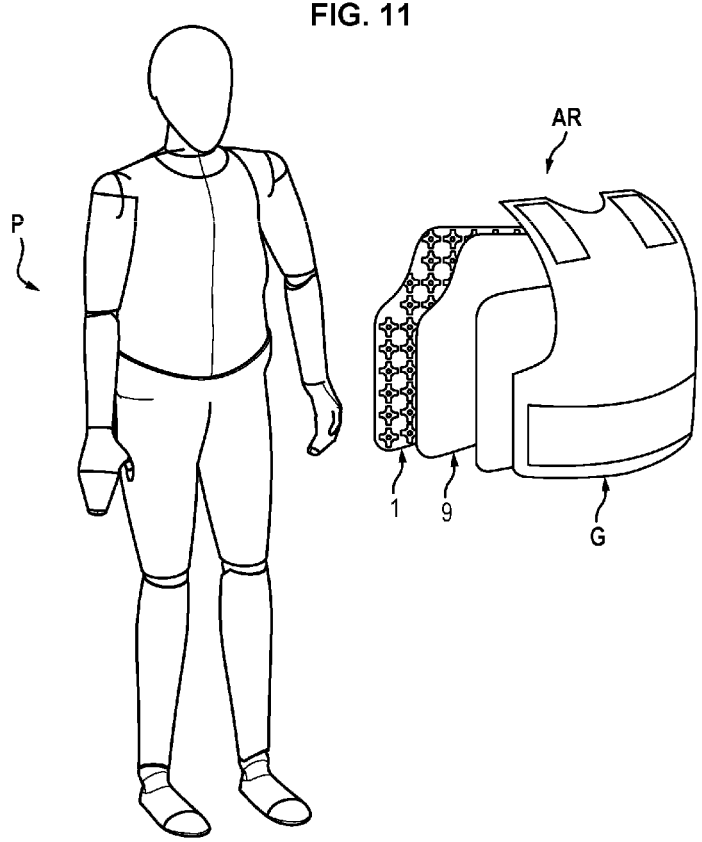

INFLATABLE CELLULAR STRUCTURE AND ARTICLE EQUIPPED THEREWITH

GENERAL TECHNICAL FIELD

The present invention lies in the field of devices for protecting individuals when they fall or are the target of an impact.

It relates in particular to an inflatable shock-absorbing cellular structure.

STATE OF THE ART

The term "rear effect" commonly refers to the significant bending mechanism due to the dynamic depression cone generated by the impact of a projectile or resulting from a fall.

It arises from a transfer of kinetic energy to the body.

Examples of the consequences of the rear effect caused by a fall or a projectile on a human body are given below:

Almost systematic parietal injuries including:
Skin erosions and wounds;
Skin vasomotor reaction;
Bone fractures;
Breaking of the parietal pleura generally associated with rib fractures.
Lung injuries including:
Lung contusions and hemorrhages;
Pneumothorax, gas embolism and hemothorax;
Abdominal injuries.

Abdominal injuries, particularly concerning the solid organs located in contact with the wall (liver, spleen, kidneys).

Heart injuries.

Bone injuries, fractures, often limited to the area in contact with the deformation cone, but possibly associated with distant fractures or dislocations. There are also spinal injuries and occasionally back injuries.

One solution for measuring the rear effect is to use the viscous criterion ("VCmax") which corresponds to the maximum of the product of the speed of deformation by the compression rate related to the maximum deformation as a function of time. This "VCmax" has the advantage of only using easily accessible data and can serve as a basis for comparisons between the various protection solutions.

In any case, the rear effect can be the cause of serious or incapacitating injuries. For the same protection and the same projectile (or identical fall characteristics), the severity of the injuries as well as the importance of the physical parameters during the impact are linked to the impact energy of the projectile or of the fall and to its speed of transmission to the body.

This problem is all the more significant since flexible bulletproof vests have been recently developed, so that under the effect of an impact, the vest deforms backwards, thus transmitting a significant energy wave.

However, this kinetic energy at the moment of the impact does not correspond to the energy transmitted to the thorax. It depends on the protection in place between them. This protection must be able to deform sufficiently but not too much to absorb the energy, without causing discomfort to the user.

In some cases, it is possible to have recourse to a "tension shield" which is disposed between the thorax of the individual and the bulletproof vest which has the function of spreading and absorbing all or part of the energy of impact. More specifically, the objective of such a shield on impacts at very high speed is to distribute the forces in order to reduce them. In practice, such a shield does not fulfill this function perfectly. In any event, in order to compare several types of protection, it is necessary to establish a link between the injuries and the dynamics of deformation of the rear face, that is to say the one in contact with the body.

Thus, there are inflatable protections which are either compartmentalized or in one piece or include partitioning welds, and have as main drawback a bulk (thickness) greater than 30 mm, and a rigidity depending on their inflation pressure.

Their different compartments are weakened if the inflation pressure is too high, because of their excessive volume of air. It then behaves like an inflatable ball.

For example, US 876 237 describes an inflatable protection for the use of baseball players, which aims to divide the inflatable parts that constitute it, so that in case one of them is perforated, the remaining parts remain inflated to continue to ensure a protection. There is here no logic of management of the pressure between the parts, but simply a desire to isolate the parts in case of puncture.

U.S. Pat. No. 3,550,159 describes a cellular structure adapted to be worn by a person in order to be protected against shocks. It involves here a structure formed of several thicknesses of contiguous cells. Each cell comprises two large parallel faces and four partitions welded to said large faces, so that it has the general shape of a rectangular parallelepiped.

Holes formed in some partitions allow air to pass in the direction of the thickness and laterally.

The fact of superimposing several layers of cells is a notable drawback which opposes ergonomic use. Moreover, in case of excessive inflation of the cells, these take the form of a balloon.

In document U.S. Pat. No. 3,995,320, it is proposed to overcome the drawbacks of the document discussed above. It involves here a welded assembly of two panels made of plastic material which here form a juxtaposition of longitudinal flanges which communicate with their neighbors by several air exhaust channels. The main drawback of this type of structure is that in case of shock, it is the entire impacted flange that deforms, this deformation being significant due to the high number of air exhaust channels.

An additional prior art is composed of the documents U.S. Pat. No. 5,771,490 (which describes the characteristics of the preamble of the appended claim 1) , U.S. Pat. Nos. 5,030,501 and 5,238,231.

The objective of the present invention is to propose a structure of low thickness which, when it is strongly inflated, allows effectively addressing the "rear effect" and can deform in all directions, while being pleasant to wear and allowing great freedom of movement for its user.

PRESENTATION OF THE INVENTION

Thus, the invention relates to an inflatable shock-absorbing cellular structure which consists of two sealed sheets welded to each other along weld lines which delimit inflatable cells, said inflatable cells are arranged in at least one two-dimensional matrix of n rows and m columns of cells, n and m being equal or different integers, each greater than or equal to 2, a peripheral cell of said matrix is connected to an inflation nozzle;

which is characterized in that:

said cells are not contiguous;

the cells of the row and/or of the column to which said peripheral cell connected to said inflation nozzle belongs, communicate step by step via a channel forming a constriction, while each remaining cell from said matrix is also connected to at least one of the neighboring cells of the same row and/or of the same column by a communication channel forming a constriction, each of said channels is shaped to slow down the flow of an inflation fluid passing therethrough, or this structure incorporates means shaped to slow down the flow of a fluid for inflating the cells through each of said channels forming a constriction;

Thanks to these characteristics of the invention, this involves a structure of reduced thickness, which can be deformed that is to say folded because the cells are not contiguous, and which has excellent shock-absorbing qualities, thus limiting the aforementioned rear effect phenomenon.

Expressed differently, such a structure is fine, flexible and light. As this is an inflatable structure, the inflation management must be strong for it to be well inflated and the dissipation obtained by the movement of the air during impact must be organized and slowed down step by step for the structure remains inflated while restraining the shock.

According to other advantageous and non-limiting characteristics of the invention, taken alone or according to any combination of at least two of them:

each cell of said matrix communicates with each of the neighboring cells of the same row and of the same column by a channel forming a constriction;

with the exception of the cells of the peripheral row and/or column connected to said inflation nozzle, the remaining cells communicate only with two of the neighboring cells of the same row and/or of the same column by a channel forming a constriction;

it is provided with an overpressure exhaust valve;

said sealed sheets are made of/based on thermoplastic polyurethane.

in the inflated state, the ratio between the largest dimension of the cross section of a cell and the largest dimension of the cross section of a channel (D/d) is at least equal to 10, preferably at least equal to 14;

said channels have a sinuous shape;

at least some cells contain, at one end of said channel, a tilting flap which disappears that is to say retracts during the passage of said inflation fluid in a flow direction, respectively presses against said end of said channel in the opposite direction, thus impeding the passage of the fluid in said channel;

a porous intermediate layer is interposed between said two sealed sheets;

said intermediate layer is made of/based on thermoplastic polyurethane.

The invention also relates to an item, in particular a clothing item, for protection against shocks, characterized in that it is provided with at least one structure according to any of the preceding characteristics.

Advantageously, the clothing item is chosen from the following group: bulletproof vest, breastplate, jacket, waistcoat, coat, body protective element.

DESCRIPTION OF THE FIGURES

Other characteristics and advantages of the invention will appear from the description which will now be made with reference to the appended drawings, which represent, by way of indication but without limitation, various possible embodiments.

In these drawings:

FIG. 9 is a partial sectional view of a structure according to the invention in which two neighboring cells contain a tilting flap at one end of the channel forming a constriction, showing more specifically the behavior of this flap in a first direction of circulation of an inflation fluid;

FIG. 10 is a view similar to the previous one, the direction of circulation of the fluid being opposite to the previous one;

FIG. 11 is a diagram intended to illustrate a possible application of the structure according to the invention.

DETAILED DESCRIPTION OF THE INVENTION

Figure 1:
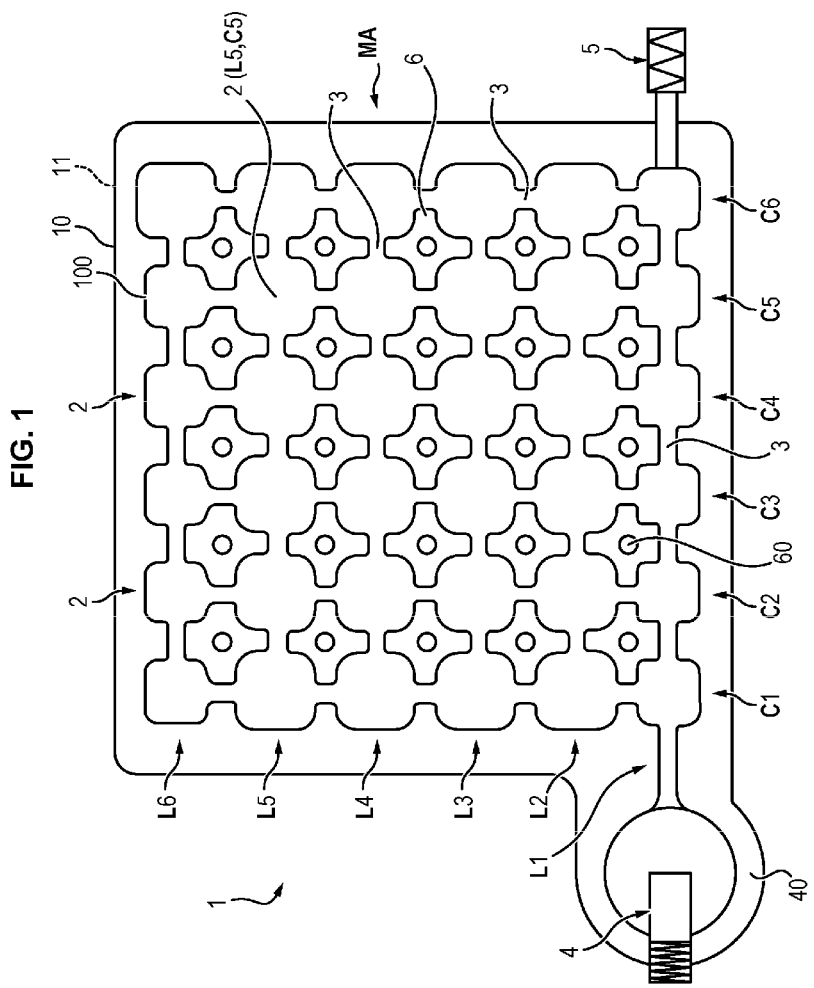
FIG. 1 is a simplified top view of a first embodiment of an inflatable cellular structure according to the invention.

The appended FIG. 1 represents an inflatable shock-absorbing cellular structure 1 according to the invention.

This figure and the other figures are simply intended to illustrate the invention. This means that they do not reflect reality, in particular in terms of dimensions, shapes and proportions.

The aforementioned structure 1 essentially consists of two sealed sheets 10 and 11. Advantageously, these sheets are made of high-resistance plastic material. Thus, a preferred material within the framework of the invention is a "TPU", that is to say a thermoplastic polyurethane.

In addition to its qualities of resistance even at reduced thickness, such a material is particularly suitable for a welding, in particular high-frequency welding, which is a well known technique for its high resistance.

In the embodiment presented here, the structure 1 is substantially inscribed within a square. However, this is a non-limiting shape so that the contour of the structure can have a different, for example rectangular, layout. In practice, this layout is adapted to the area of the body that this structure is required to protect. The two sheets 10 and 11 are welded to each other along weld lines 100 which delimit individual inflatable cells 2. The way in which this structure is manufactured will be considered later in the description.

According to the invention, the cells 2 are arranged within the structure 1 according to a two-dimensional matrix MA which consists of n rows and m columns of cells 2.

In the example shown here, n and m are equal to 6. However, this is an example so that these values can be different from six. In any case, according to the invention, these n and m are integers greater than or equal to 2. It is of course possible to envisage that the number of cells in at least one row and/or column is different from the rest of the rows and columns.

Figure 2:
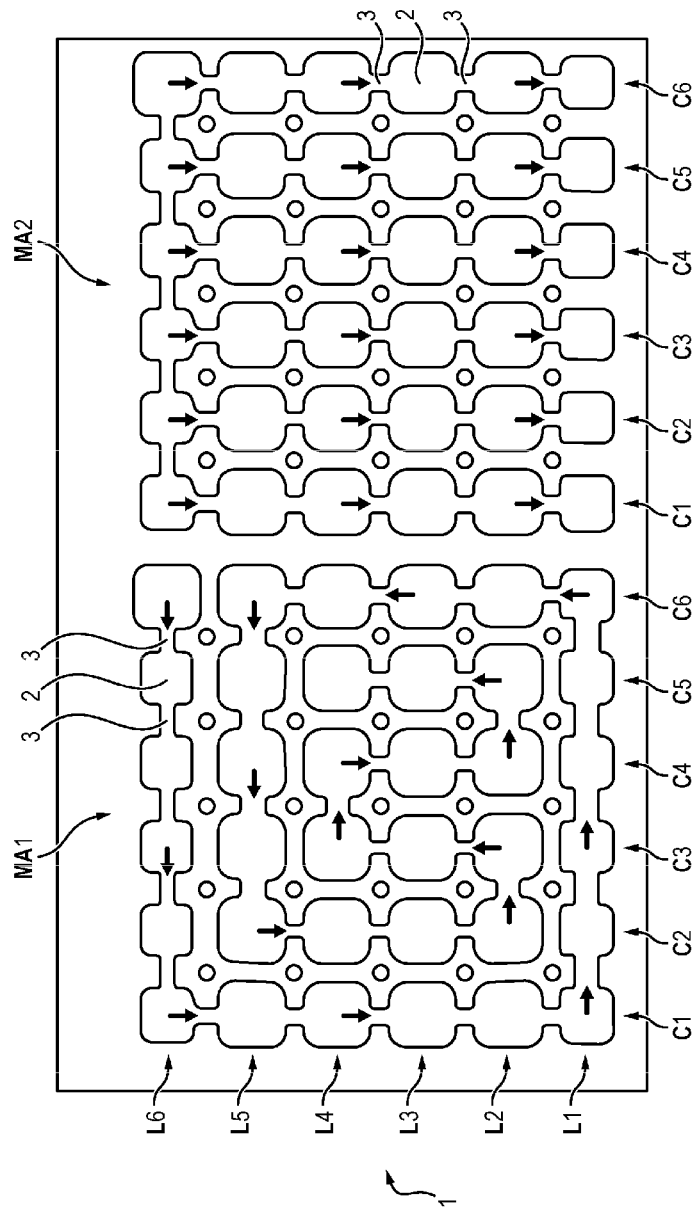
FIG. 2 is also a simplified top view of another embodiment of this structure, which here comprises two matrices of cells.
Figure 3:
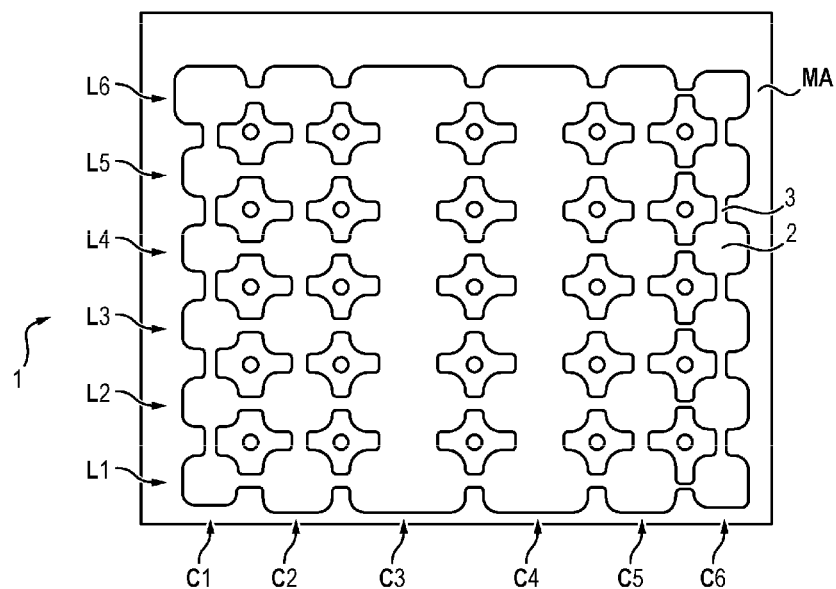
FIG. 3 is still a top view of a third embodiment of said structure.

In the appended FIGS. 1 to 3, the rows are referenced L1 to L6, while the columns are referenced C1 to C6. In this way, the cell 2(L2/C4) identifies the cell at the intersection of the row L2 and of the column C4.

In FIG. 1, the cells have approximately a square-shaped contour with rounded corners. However, any other shape (for example circular shape) can be envisaged. Preferably, the use of angular shapes will be avoided so as not to weaken the weld lines 100.

Still according to the invention, a peripheral cell 2 of the matrix MA is connected to an inflation nozzle 4. This nozzle 4 is here integrated within an appendage 40 which is in one piece with the structure 1. In other words, this appendage 40 consists of the welded joining of the sheets 10 and 11. The nozzle 4 is for example of the type that can be connected to a hand pump.

The expression "peripheral cell" means one of the cells closest to one of the edges of the structure 1. It is the cell 2(L1/C1), but it could be, in another embodiment, the cell 2(L1/C3) for example.

According to the invention, the cells of the line L1 to which the cell 2 connected to the inflation nozzle 4 belongs communicate step by step that is to say from a cell 2 to the neighboring cell 2, by a channel 3 forming a constriction.

Throughout the present text, the term "channel" means a small duct that extends between two cells, without being part of them. Due to the presence of these channels, the cells are not contiguous because they are separated by channels, so that the weld lines which delimit a given cell are different from those that delimit a neighboring cell.

In practice, the channel 3 is delimited, like the cells 2, by the weld lines 100 mentioned above. The term "constriction" means that the width dimensioning of this channel is very much lower than that of the cells 2 with which it communicates.

Figure 4:
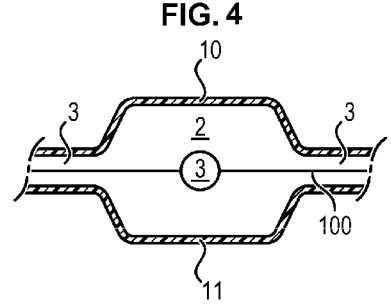
FIG. 4 is a partial view in vertical section of a structure according to the invention, intended to show how the two sheets that constitute it are joined together.

Reference can be made to FIG. 4 which shows not only a cell 2 (its shape has been deliberately stylized), but also three channels 3 to which it is connected, as well as one of the weld lines 100 that delimit it.

According to the embodiment of FIG. 1, each cell 2 of the line L1 communicates with the cells 2 of the line L2 via channels 3 and so on for the other lines. And it is the same for the columns, so that each cell 2 communicates with its neighbors of the adjoining rows and columns by a channel 3.

Under these conditions, once an inflation fluid such as air is introduced into the structure 1, it can spread into all the cells along random paths.

Figure 6:
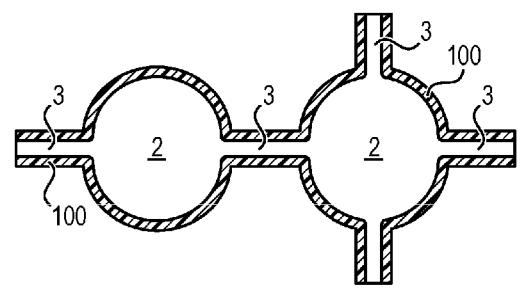
FIG. 6 is a diagram similar to that of FIG. 5, one of the cells having four channels forming a constriction.

Referring now to FIG. 6, it is observed that the capacity of the cell 2 on the right to expel air is greater than that of the cell on the left due to the greater number of channels to which it is connected.

Due to the shape of the cells 2 and their non-contiguous organization (indeed, they are distant from each other due to the presence of the channels 3), there are at the crossroads of the non-peripheral cells "pads" 6 in general shape of a cross, in which the sheets 10 and 11 are not secured to each other. It will be noted here, in the center of these pads 6, the existence of orifices 60 which act as ventilation holes ("breathing" nature of the structure) and some of which authorize the structure 1 to be fixed to a support.

The presence of these pads 6 at the intersection of the rows and columns of cells 2 also authorize a certain deformation of the structure 1 along perpendicular directions, for example with a view to fixing it to a non-planar support.

Finally, FIG. 1 also represents a pressure relief valve 5 connected to the cell 2(L1/C6) which, although not essential, allows exhaust of air in case of overpressure (for example for reasons of excessive inflation, temperature rise, displacement at increasing altitude, etc.).

The example of FIG. 2 involves a structure 1 which is provided with two matrices MA1 and MA2 disposed side by side.

These have substantially the same "architecture" as the matrix M of FIG. 1. However, they differ in the number and disposition of the channels 3 connecting the cells.

Thus, considering the matrix M1 and assuming that the inflation nozzle (not represented) is connected to the cell 2(L6/C6), the cells communicate step by step in the line L6. On the other hand, only the cell 2(L6, C1) communicates with the neighboring cell of the line L5 and it is noted step by step that the channels 3 are present only to ensure a communication between the cells 2 according to a spiral or substantially spiral organization.

Under these conditions and considering for example that the cell 2(L4/C5) undergoes a sufficient impact for it to deform, the air stored therein can only circulate through the channel 3 which connects it to the cell 2(L3/C5). It is easy to understand that its capacity to deform is lower compared to the same cell 2(L4/C5) of the structure 1 of FIG. 1, which communicates with all its neighbors by four channels.

Under these conditions, it will be preferred to use a matrix M1 in situations in which the structure undergoes rapid and violent shocks, such as military context situations, for example war, riots, etc. On the other hand, the structure 1 of FIG. 1 will rather be used for less violent shocks such as those encountered when practicing sports.

Within the matrix M2 of FIG. 2, the cells communicate step by step in the row L6. However, the communication with the remaining ones is done exclusively according to the orientation of the columns C1 to C6. In this configuration, the capacity of the cells 2 to deform is substantially the same as in the structure of the matrix Ml.

The embodiment of FIG. 3 (where the inflation nozzle has not been represented), involves a disposition of the cells 2 and channels 3 similar to that of the matrix of FIG. 1.

It is however observed that the size of the cells 2 of the columns C3 and C4 is greater than that of the other cells.

This is explained for example by the morphology or by the region of the body that such a structure is intended to protect. Thus, for example, this structure is intended to cover the back of an individual, so that the largest cells 2 of the columns C3 and C4 will cover the vertebral region.

Figure 5:
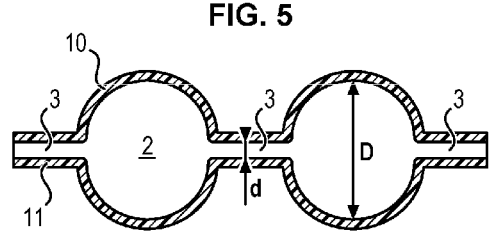
FIG. 5 is a diagram showing, in section, two neighboring cells communicating by a channel forming a constriction.

The situation represented in FIG. 5 is a figment of the imagination. More specifically, two neighboring cells 2 connected by a channel 3 are represented and it is considered that the structure in which they are integrated has been inflated to the maximum. In such a situation, it is considered that both the cells 2 and channels 3 occupy a maximum volume.

Artificially, it is considered here that the cross section of the cells 2 and of the channels 3 is circular and their diameter was referenced D and d. In reality, these sections are not strictly circular. In figurative language, these sections look more like a rugby ball. Under these conditions, the values D and d correspond to the largest dimension of their section.

According to one advantageous embodiment of the invention, the ratio D/d is at least equal to 10, preferably at least equal to 14. Thus, the dimensions of the channels 3 are large enough to allow the inflation of the structure 1, but small enough to impede that is to say limit the exhaust of air to the neighboring cells in case of shocks.

It is also possible to envisage other means for limiting/impeding this exhaust of air.

Figure 7:
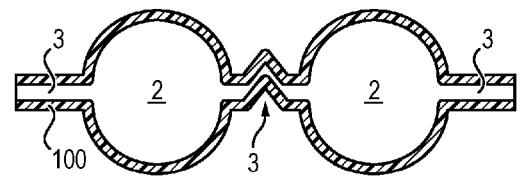
FIG. 7 is another diagram similar to that of FIG. 5, in which the channel connecting the two cells has a sinuous shape.

Thus, in accordance with the embodiment of FIG. 7, channels 3 whose layout is sinuous are involved. Under these conditions, it is understood that during the inflation of the structure as well as during an impact, the air is forced to circulate in the channels 3 in order to reach the cells. However, this circulation is impeded by the various baffles resulting from the sinuosity. In practice, during an impact, the cells 2 deform, but relatively little, so that the shock wave is only very partially transmitted. In other words, the structure 1 is neither completely rigid nor too deflated.

Figure 8:
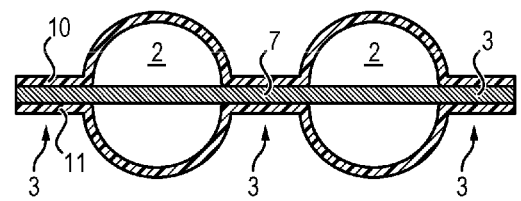
FIG. 8 is a partial sectional view of a structure according to the invention, in which a porous intermediate layer is interposed between the two sheets that constitute it.

In the case of the embodiment of FIG. 8, a porous intermediate layer 7 which is interposed between the sheets 10 and 11 is involved. In practice, the nature and the thickness of this layer must be chosen so that it is sandwiched and welded together with said sheets. Advantageously, this layer will be of the same nature as the sheets 10 and 11 and will have a cellular structure with open cells so as to be porous to allow air to pass.

But as in the previous embodiment, this circulation is relatively impeded.

Thanks to the invention, the fact that the cells are not contiguous allows giving excellent deformability to the structure. Furthermore, due to the presence of channels between these cells and in accordance with all the embodiments described, it is possible to effectively slow down the displacement of the fluid between the cells, so that the shock wave transmitted by the targeted cells is only partially transmitted to the surrounding region.

In the alternative embodiment of FIGS. 9 and 10, the cells 2 have the particularity of including a tilting flap 8 which is fixed to the wall of one of the sheets 10 and 11 and which extends at the end of one of the channels 3. Thus, when the air circulates from right to left as shown in FIG. 9, the air stream is sufficient for each flap 8 to retract and not to oppose it. On the other hand, in case of circulation in the opposite direction, each flap presses against the end of the channel 3, at least partially obturating it. In practice, it may be a tab, for example having an oval shape, which is welded to a wall of the cell 2 facing the channel 3 and which obstructs the latter as soon as a pressure is exerted on the cell.

Finally, FIG. 11 represents in a very simplified manner an individual P equipped with a clothing item AR. The latter consists (from right to left in the figure) of a bulletproof vest G, a tension shield 9 and a structure 1 in accordance with the present invention.

Of course, in a variant not represented, the structure according to the invention can be simply placed inside a garment.

It will be noted that the organization of the cells 2 according to a two-dimensional matrix allows adapting the design of this matrix according to the clothing item desired to be equipped.

As an indication, such a structure, depending on the use to be made of it, is suitable for inflation of between 10 and 30 PSI, that is to say approximately 0.7 to 2 bar, which authorizes the use of a hand pump (or even a mini-compressor or an inflation bulb).

This structure adapts to a light weight impact at very high (ballistic) speed but also to a heavy weight impact at very low speed (fall during the practice of extreme sports) thanks to the wide possibility of adjustment of the pressure due to its resistance.

The different steps of an example of manufacture of a structure according to the invention can be summarized as follows:

1/Definition of the resistance of the air flow rate at the outlet of the cells according to the concerned shock. By way of example, an impact of 200 joules leading to a transmitted force of 12,000 Newton or an impact of 50 Joules leading to a transmitted force of 4,000 Newton can be envisaged. In practice, a shot at 200 joules is for example carried out, a performance "X" is observed with a channel 3 of simple geometry. Then, the same test is carried out with another channel design and it is assumed here that the performance "Y" is acceptable. The best configuration for the envisaged application is then deduced therefrom.

2/Calibration of the pressure relief valve 5;
3/Drawings of the shape of the channels 3;
4/Production of the mold for the HF welding;
5/Welding of the TPU sheets according to their thickness;
6/Inflation using the hand pump;
7/Shock and measurement Validation using a sensor/the modeling clay known as "plastiline"/by the "pig test" (measurement of the cardiac rear effect on a living subject).

This last test consists of putting the animal in a brain-death situation, probing it and then measuring the heart rate change following the shot during the shot, its heart rate and other reactions can be measured.

Throughout the foregoing description, it has been envisaged that the fluid used to inflate the cells is air. But it is also possible to use a liquid such as water.

The invention claimed is:

1. An inflatable shock-absorbing cellular structure which comprises two sealed sheets welded to each other along weld lines which delimit inflatable cells,
   said inflatable cells being arranged in at least one two-dimensional matrix of n rows and m columns of cells, n and m being equal or different integers, each greater than or equal to 2;
   a peripheral cell of said matrix is connected to an inflation nozzle;
   wherein:
   said cells are not contiguous;
   the cells of the row and/or of the column to which said peripheral cell connected to said inflation nozzle belongs, communicate step by step via a channel which is a small duct that extends between two cells, without being part of them, forming a constriction, while each remaining cell from said matrix is also connected to at least one of the neighboring cells of the same row and/or of the same column by a communication channel which is a small duct that extends between two cells, without being part of them, forming a constriction,
   each of said channels is shaped to slow down the flow of an inflation fluid passing therethrough, or said structure incorporates means shaped to slow down the flow of a fluid for inflating said cells through said channels forming a constriction, and
   in the inflated state, the ratio between the largest dimension of the cross section of one of said cells and the largest dimension of the cross section of one of said channels is at least equal to 10.

2. The structure according to claim 1, wherein each cell of said matrix communicates with each of the neighboring cells of the same row and of the same column by a channel forming a constriction.

3. The structure according to claim 1, wherein, with the exception of the cells of the peripheral row and/or column connected to said inflation nozzle, the remaining cells communicate only with two of the neighboring cells of the same row and/or of the same column by a channel forming a constriction.

4. The structure according to claim 1, wherein it is provided with an overpressure exhaust valve.

5. The structure according to claim 1, wherein said sealed sheets are made of/based on thermoplastic polyurethane.

6. The structure according to claim 1, wherein, in the inflated state, the ratio between the largest dimension of the cross section of one of said cells) and the largest dimension of the cross section of one of said channels is least equal to 14.

7. The structure according to claim 1, wherein said channels have a sinuous shape.

8. The structure according to claim 1, wherein at least some of said cells contain, at one end of said channel, a tilting flap which disappears that is to say retracts during the passage of said inflation fluid in a flow direction, respectively presses against said end of said channel in the opposite direction, thus impeding the passage of the fluid in said channel.

9. The structure according to claim 1, wherein a porous intermediate layer is interposed between said two sealed sheets.

10. The structure according to claim 9, wherein said intermediate layer is made of/based on thermoplastic polyurethane.

11. An item for protection against shocks, wherein it is provided with at least one structure according to claim 1.

12. The item according to claim 11, which is a clothing item.

13. The clothing item according to claim 12, wherein it is chosen from the following group: bulletproof vest, breastplate, jacket, waistcoat, coat, body protective element.

* * * * *